US011893615B2

(12) United States Patent
Tuli et al.

(10) Patent No.: US 11,893,615 B2
(45) Date of Patent: Feb. 6, 2024

(54) SPOT MARKET: LOCATION AWARE COMMERCE FOR AN EVENT

(71) Applicant: eBay Inc., San Jose, CA (US)

(72) Inventors: Vikram Tuli, San Jose, CA (US); Jeffrey Chen Chieh Leng, San Jose, CA (US); Daniel Morales, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/167,803

(22) Filed: Feb. 4, 2021

(65) Prior Publication Data

US 2021/0158414 A1     May 27, 2021

Related U.S. Application Data

(63) Continuation of application No. 16/040,770, filed on Jul. 20, 2018, now Pat. No. 10,943,277.

(51) Int. Cl.
*G06Q 30/00* (2023.01)
*G06Q 30/0601* (2023.01)

(52) U.S. Cl.
CPC .................. *G06Q 30/0609* (2013.01)

(58) Field of Classification Search
CPC ........... G06Q 30/0601; G06Q 30/0623; G06Q 30/0641
See application file for complete search history.

(56) References Cited

U.S. PATENT DOCUMENTS 6,311,178 B1 * 10/2001 Bi ..................... G06F 16/24578
                                                     707/948
7,133,847 B2    11/2006   Himmelstein
8,407,110 B1    3/2013   Joseph et al.
(Continued)

FOREIGN PATENT DOCUMENTS

CN        101354766       1/2009
CN        108027930       5/2018
(Continued)

OTHER PUBLICATIONS

Bojanic, David C., and Rodney B. Warnick. "The role of purchase decision involvement in a special event." Journal of Travel Research 51.3 (2012): 357-366. (Year: 2012).*

(Continued)

*Primary Examiner* — Christopher B Seibert
(74) *Attorney, Agent, or Firm* — SCHWEGMAN LUNDEBRG & WOESSNER, P.A.

(57) ABSTRACT

A system to receive data indicative of physical location from a first computing device and to associate an event with the physical location, the event occurring at the physical location and including the physical presence of two or more entities. The system further to receive registration information from one or more entities that are associated with the event and to generate, using the registration information, a data object to enable a first entity of the one or more entities and a second entity of the one or more entities to exchange one or more items while the first entity and the second entity are both physically present at the event. The system additionally to publish the data object to a second computing device based on a participation criteria, the second device being operated by at least one of the first entity and the second entity.

20 Claims, 9 Drawing Sheets

(56) References Cited

U.S. PATENT DOCUMENTS

| | | | |
|---|---|---|---|
| 8,498,974 B1 * | 7/2013 | Kim | G06F 16/245 707/706 |
| 8,548,865 B1 | 10/2013 | Ho | |
| 10,943,277 B2 | 3/2021 | Tuli et al. | |
| 2002/0082969 A1 * | 6/2002 | O'Keeffe | G06Q 40/04 705/37 |
| 2003/0014330 A1 | 1/2003 | Showghi et al. | |
| 2003/0065805 A1 | 4/2003 | Barnes, Jr. | |
| 2004/0006497 A1 * | 1/2004 | Nestor | G06Q 10/02 705/5 |
| 2007/0112730 A1 * | 5/2007 | Gulli | G06F 16/951 |
| 2007/0124228 A1 | 5/2007 | Elias et al. | |
| 2007/0174144 A1 * | 7/2007 | Borders | G06Q 10/0837 705/26.81 |
| 2007/0208598 A1 * | 9/2007 | McGrady | G16H 15/00 705/3 |
| 2007/0211651 A1 * | 9/2007 | Ahmed | H04L 67/104 370/256 |
| 2008/0033771 A1 | 2/2008 | Barry | |
| 2008/0078828 A1 * | 4/2008 | Helmin | G16H 70/40 235/375 |
| 2008/0319778 A1 | 12/2008 | Abhyanker | |
| 2009/0119223 A1 | 5/2009 | Ourega | |
| 2009/0234848 A1 * | 9/2009 | Leff | G06F 16/951 707/999.005 |
| 2010/0138281 A1 * | 6/2010 | Zhang | G06Q 10/087 705/28 |
| 2010/0169361 A1 * | 7/2010 | Chen | G06F 16/285 707/769 |
| 2011/0196760 A1 | 8/2011 | Howard et al. | |
| 2012/0197752 A1 | 8/2012 | Shen et al. | |
| 2013/0005475 A1 | 1/2013 | Mahajan et al. | |
| 2013/0151292 A1 | 6/2013 | Van Deloo et al. | |
| 2013/0151372 A1 | 6/2013 | Liu | |
| 2014/0039945 A1 | 2/2014 | Coady et al. | |
| 2014/0046818 A1 | 2/2014 | Chung et al. | |
| 2014/0335899 A1 | 11/2014 | Fan et al. | |
| 2015/0180971 A1 * | 6/2015 | Varney | H04L 41/5041 709/204 |
| 2016/0055430 A1 | 2/2016 | Naji | |
| 2016/0080390 A1 * | 3/2016 | Kalb | G06Q 50/01 726/4 |
| 2016/0104131 A1 | 4/2016 | Layng | |
| 2016/0292737 A1 * | 10/2016 | Barnes, Jr. | G06Q 20/322 |
| 2017/0357959 A1 | 12/2017 | Checketts | |
| 2018/0025402 A1 | 1/2018 | Morris | |
| 2020/0027145 A1 | 1/2020 | Tuli et al. | |

FOREIGN PATENT DOCUMENTS

| | | |
|---|---|---|
| KR | 10-2008-0082584 A | 9/2008 |
| WO | 2001/024091 A1 | 4/2001 |
| WO | 2003/032213 A2 | 4/2003 |
| WO | 2003/032218 A2 | 4/2003 |
| WO | 2020/018316 A1 | 1/2020 |

OTHER PUBLICATIONS

Non Final Office Action Received for U.S. Appl. No. 16/040,770, dated Jun. 15, 2020, 11 pages.

Notice Of Allowance received for U.S. Appl. No. 16/040,770, dated Nov. 4, 2020, 15 Pages.

Dahl et al., "Embarrassment in consumer purchase: The roles of social presence and purchase familiarity", Journal of consumer research 28.3 (2001 ): 473-481. (Year: 2001), 2001, 9 Pages.

International Preliminary Report on Patentability Received for PCT Patent Application No. PCT/US2019/040984, dated Feb. 4, 2021, 9 Pages.

International Search Report received for PCT Patent Application No. PCT/US2019/040984, dated Nov. 8, 2019, 4 pages.

International Written Opinion received for PCT Patent Application No. PCT/US2019/040984 dated Sep. 30, 2019, 8 pages.

"Chinese Application Serial No. 201980048662.7, Office Action dated Nov. 14, 2023", With English machine translation, 42 pgs.

* cited by examiner

SPOT MARKET: LOCATION AWARE COMMERCE FOR AN EVENT

CLAIM OF PRIORITY

This application is a continuation of U.S. application Ser. No. 16/040,770, filed Jul. 20, 2018, which is hereby incorporated by reference in its entirety.

TECHNICAL FIELD

Embodiments of the present disclosure relate generally to computing systems, more particularly, but not by way of limitation, to processing event transactions between computing devices in a networked computing system.

BACKGROUND

Network-based marketplaces, such as electronic commerce platforms, have grown in popularity with vendors and consumers due to their convenience and the general perception that these markets offer lower prices than traditional physical markets. Such network-based marketplaces enable consumers to browse and purchase goods or services from any convenient location using a network connected computing device Such network-based marketplaces further provide consumers with an increased sense of satisfaction or security in a deal they obtained in their purchase due to the ability of these platforms to enable consumers to easily compare prices or deals from multiple vendors. These network-based marketplaces, however, fail to take advantage of the spontaneous opportunities for commerce that can arise among strangers who are physical present a physical location.

BRIEF DESCRIPTION OF THE DRAWINGS

Various ones of the appended drawings merely illustrate example embodiments of the present disclosure and cannot be considered as limiting its scope.

Figure 1:
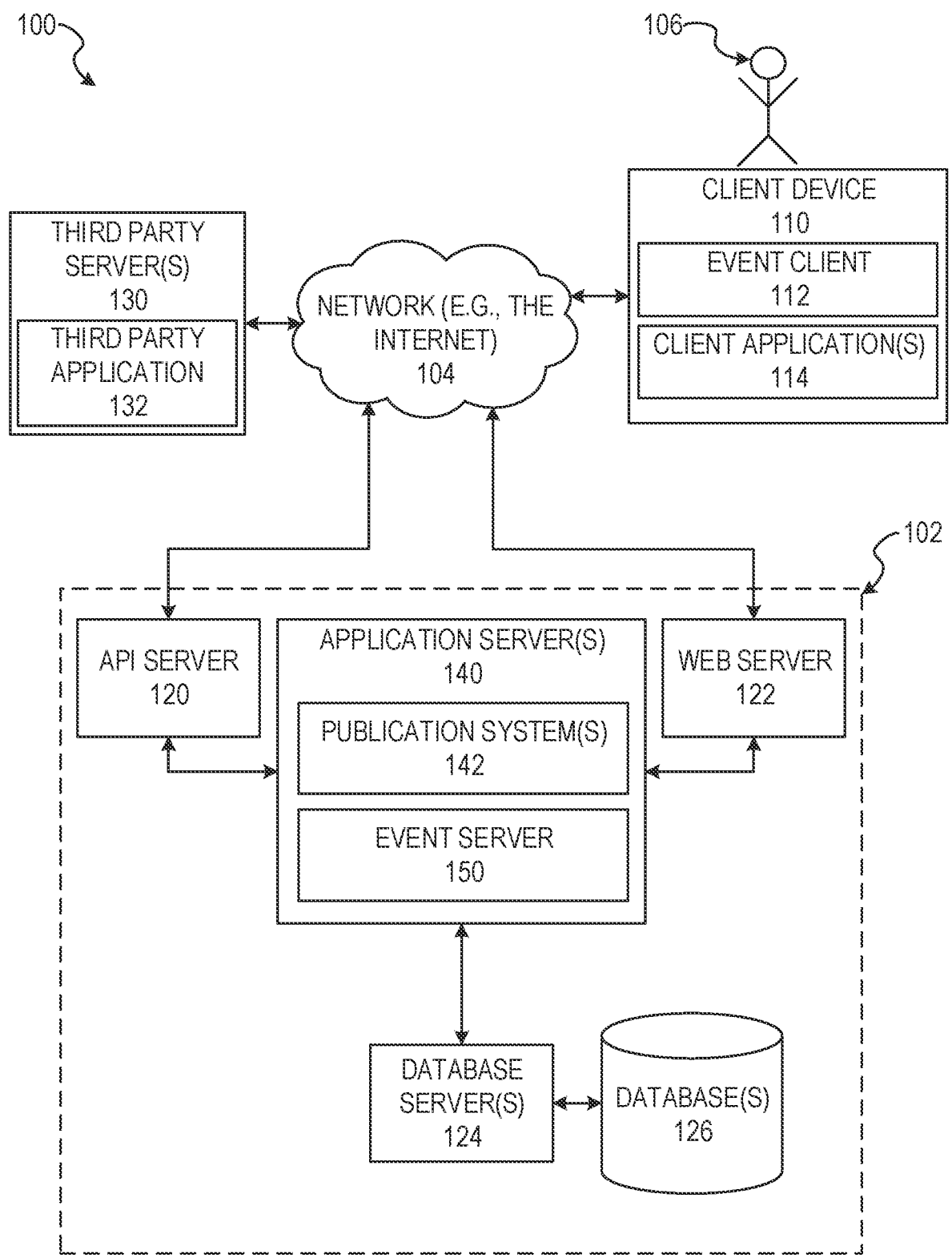
FIG. 1 is a diagram illustrating an example of a network-based system for facilitating transactions between entities at an event at a physical location, according to various embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Physical presence at an event may generate transaction opportunities between two or more parties based on, for example, a momentary need. Such transaction opportunities may arise due to a first entity (e.g., a consumer) at a physical event having a need for an item that corresponds to an item for which a second entity (e.g., a vendor, event organizer, or another consumer) at the physical event has a need to dispose. Such transaction opportunities may be improved (e.g., may have a greater chance occurring or a greater chance of success) when the physical event includes entities (e.g., participants) that have common interests, such as due to their mutual physical presence at a physical event. In an example, when a physical event is a concert, entities at the concert may share a common interest in items related to the subject matter of the concert or to the concert itself. Such items may include an unfilled concert seat, or merchandise or other items associated with the concert. Such transactional opportunities may also be improved by to the fact entities that are physically present at a physical event may be motivated to timely engage in a transaction, such a due the ephemeral nature of needs that may arise at a physical event. As an example, a need to obtain an unfilled seat, or a need to dispose of an unfilled seat, at a concert only persist for a short time before a concert starts, or while the concert is underway.

Current network-based marketplaces are not adapted to satisfy transaction needs that arise between entities that are physically present at a physical event. Such network-based marketplaces, for example, may not be configured to enable two or more entities that are physically present at a physical event to readily exchange information to facilitate a transaction between two or more entities based on their presence at a physical event.

Other marketplaces that may exist at physical events, such as markets setup by vendors who may contract with an owner of a facility that hosts a physical event, are typically not adapted to fully address the transaction needs that arise between entities that are physically present at these events. The vendors in these markets, for example, are typically preselected, such as according to preexisting contracts between a facility owner and a vendor. Such contracts may have little or no relation to a physical event that is hosted at a facility. Additionally, such vendors may offer a generic set of items that are selected to satisfy the needs of a general audience, rather than addressing the ephemeral needs of a set of entities that arise due the presence of the entities at the physical location.

Embodiments of the present disclosure are based on techniques (e.g., systems, methods, and computer program products) for generating and operating a spontaneous network-based marketplace based on the physical presence of two or more entities at a physical event. Such spontaneous network-based marketplaces may facilitate one or more transactions between two or more entities that are physically present at a physical event. Such transactions may occur between a first patron and a second patron, patron and a vendor, or a patron and an organizer of an event. Returning to the example concert event, the techniques of the present disclosure may 1) enable a first patron to sell, or exchange, seats with a second patron, 2) enable a patron to purchase concert merchandise from a vendor at the concert, and 3) enable a patron to purchase a pass to meet the concert performers.

According to various embodiments, a spontaneous network-based marketplace may include one or more computing servers to receive event information about a physical event. Such event information may include a physical location of the physical event, a time and a date of the physical event, or one or more criteria for participating (hereinafter, "participation criteria") in the physical event. The spontaneous network-based marketplace may receive registration information from one or more entities associated with the physical event, such as by patronizing the physical event, offering items for change at the physical event, providing a venue for the physical event, or organizing the physical event. When an entity is a vendor, such registration information may include a list of items the vendor may offer for sale or exchange at the event. The spontaneous network-based marketplace may register the one or more entities based on the received participation criteria or based on the approval of the event organizer or the facility owner. The spontaneous network-based marketplace may generate an interface, such as a computer executable data object, to enable a first entity and a second entity of the one or more registered entities to exchange one or more items during the physical event. The data object (e.g., a software module or an electronic link to a software module) may be published to one or more computing device associated with the one or more registered entities. The spontaneous network-based marketplace may facilitate one or more transactions between registered entities using the published data object. Such facilitating may include authenticating registered entities, relaying purchase requests, or validating or confirming transactions.

As used herein, the term physical event may include any event that occurs at a physical location and includes the physical presence of one or more persons or entities.

With reference to FIG. 1, an example embodiment of a high-level client-server-based network architecture 100, including a network-based system 102 (e.g., a network-based marketplace) for facilitating transactions at a physical event is shown. The networked system 102, in the example forms of a network-based marketplace or payment system, provides server-side functionality via a network 104 (e.g., the Internet or wide area network (WAN)) to one or more client devices 110. FIG. 1 illustrates, for example, an event client 112 (e.g., an application, or a third-party application, such as a web browser or a social media application), and an application 114 executing on client device 110.

The client device 110 may comprise, but are not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user may interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third-party application 132, executing on third party server(s) 130, is shown as having programmatic access to the networked system 102 via the programmatic interface provided by the API server 120. For example, the third-party application 132, utilizing information retrieved from the networked system 102, supports one or more features or functions on a website hosted by the third party. The third-party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The event server 150 may provide functionality operable to facilitating transactions between two or more entities that are physically present at an event at a physical location. For example, the event server 150 may receive event information, including a physical or geographical location of a physical event, from an event organizer, such as through client device 110, the databases 126, the third-party servers 130, the publication system 142, and other sources. In some example embodiments, the event server 150 may identify or associate a physical event with the physical location. The event server 150 may also receive registration information from one or more entities that associated with at the event. The event server 150 may generate, using the registration information, a data object to enable a first entity of the one or more entities and a second entity of the one or more entities to exchange one or more items during the physical event. The event server 150 may publish the data object to a second computing device based on a participation criteria. The event server 150 may then use the published data object to generate a spontaneous network-based marketplace, such as to facilitate transactions between two or more entities that are physically present at the physical event. In some example embodiments, the event server 150 may communicate with the publication systems and payment system 142. In an alternative embodiment, the event server 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

The event client 112 may access the various publication 142 and the event server 150 via the web interface supported by the web server 122, such as through one or more social media platforms or application. More specifically, the event client 112 may interface with the web server 122 to enable a user 106 (e.g., an entity physically present at a physical event) to purchase, or to offer, items in a spontaneous network-based marketplace generated at a physical event.

Additionally, a third-party application(s) 128, executing on a third-party server(s) 130, is shown as having programmatic access to the networked system 102 via the programmatic interface provided by the API server 120. For example, the third-party application 128, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
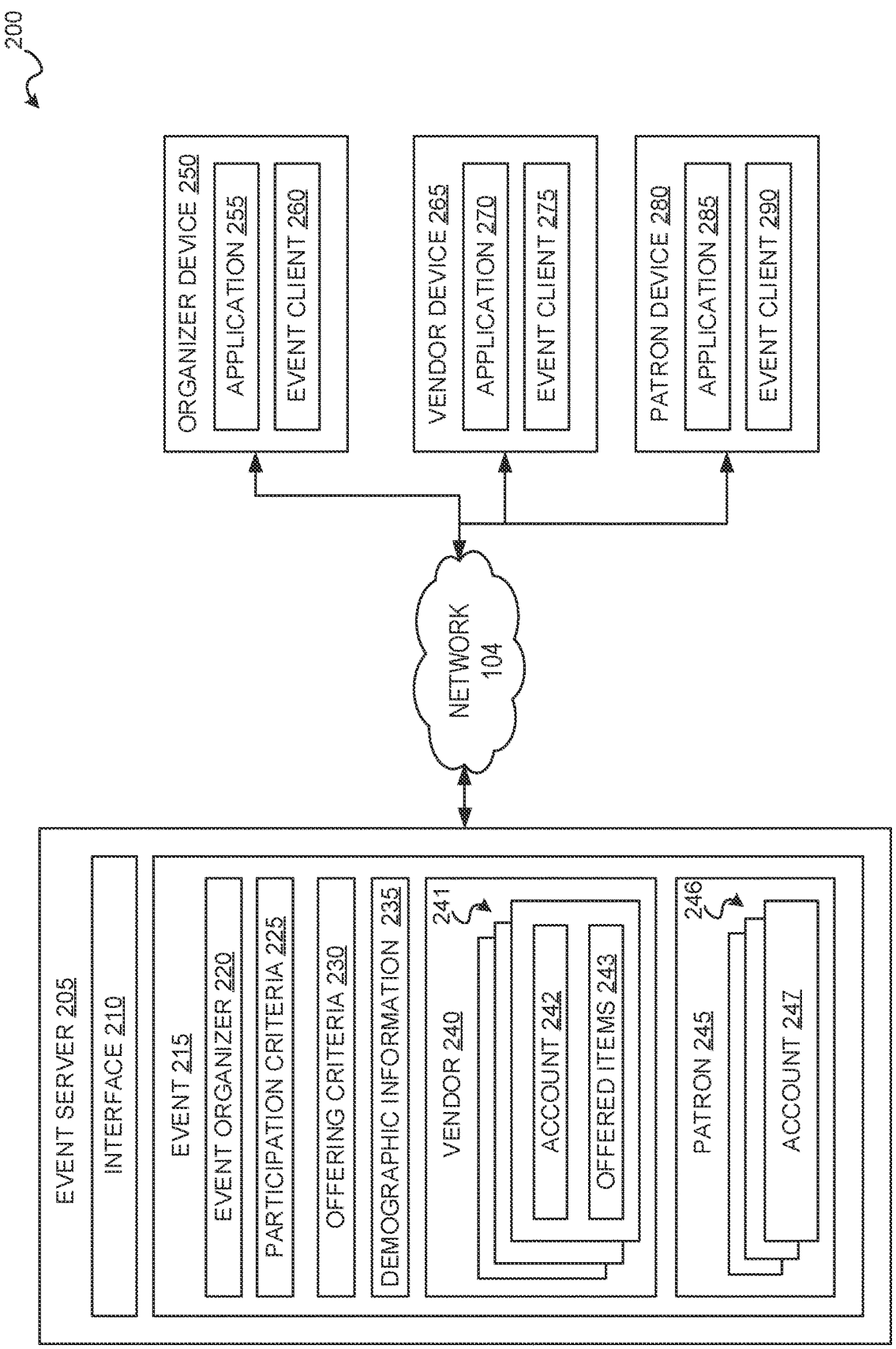
FIG. 2 is a diagram illustrating an example of a transaction system in a network-based system for facilitating transactions between entities at an event at a physical location, according to various embodiments.

FIG. 2 is a diagram illustrating an example of a transaction system 200 in a network-based system for facilitating transactions between two or more entities present a physical event, according to various embodiments. Such a transaction system 200 may form a spontaneous network-based marketplace based on the presence of one or more entities at a physical location. Such transaction system 200 may be an example of a system within the network-based system 102 formed by the event server 150 and one or more client device 110, as shown in FIG. 1. In some embodiments, the transaction system 200 may include one or more hardware circuits (e.g., accelerators, signal processors, microprocessors, and storage devices) and one or more software components (e.g., applications, scripts, modules, and other computer executable code) to spontaneously form, and to facilitate the operation of, a network-based marketplace at a physical event, such as to enable transactions (e.g., commerce) between two or more patrons, a patron and vendor, and a patron and an event organizer. The transaction system 200 may include an event server 205, an organizer device 250, vendor device 265, and one or more patron device 280. The components or subcomponents of the transaction system 200 may communicate with each other, and with other systems, using one or more network-based (e.g., using a network interface card, or other communication bus) or inter-process-based communication techniques (e.g., shared memory, or software sockets).

The event server 205 may be a computing system (e.g., a one or more computing servers), such as a cloud computing system, having one or more processing circuits configured to interface with the organizer device 250, the vendor device 265, and the patron device 280 to spontaneously form, and to facilitate the operation of, a network-based marketplace at a physical event. The event server 205 may include a client device interface 210, and one or more event objects 215.

The client device interface 210 may include one or more hardware circuits or software components for communicating with a client computing device, such as the organizer device 250, the vendor device 265, and the patron device 280, such as through the data communication network 104 (e.g., a wired or wireless data communication network). Such communicating may include receiving or responding to requests to register an event, register a vendor, register a patron, process a transaction, or to generate demographic information.

A request to register an event may be received from an event organizer, and may include event information, such as a physical location of the event and a date and time of the event. A physical location may be a geographic location, such as a park, a section of a street, or a field. A physical location may also be a facility, a building, or similar structure (e.g., an address of a building or similar structure), such as an arena or stadium, an airport, or any other structure that may operate as a venue for a physical event. Such event information may also include one or more participation criteria for prescribing which entities may register with the transaction system 200, such as to participate in a spontaneous network-based marketplace. Such event information may also include one or more offering criteria, such as to indicate merchandise expectations (e.g., conditions on items), such as the type of items that may be offered for sale or exchange through the spontaneous network-based marketplace. Such merchandise expectations may ensure that items offered for sale at a physical event conform to one or more event organizer or facility owner requirements. In some embodiments, such merchandise expectations may provide a restriction on which vendors may participate in the spontaneous network-based marketplace, such as by excluding vendors that do not offer merchandise meeting the merchandise expectations.

In some embodiments, a participation criteria may prescribe rules for an entity, such as a patron or a vendor, to register with the transactions system 200, such as to participate in a spontaneous network-based marketplace at a physical event. Such rules may require that an entity be physically present at a physical event, such as by being physically located within a specified distance of the physical event at a time that the physical even is underway. Such rules may also require that an entity be authorized to attend the physical event, such as by having a pass, ticket, or other token granting access to the physical event. Such rules may also require that an entity (e.g., a computing device operated by an entity) be authenticated, such by using a physical identification (e.g., a government issued identification, or other forms of identification, such a credit card), a set of account credentials, a unique identifier associated with a previously registered computing device operated by the entity, or any techniques for authenticating an entity.

A request to register a vendor may be received from one or more potential vendors that intend to offer one or more items for exchange at a physical event, such as by using a spontaneous network-based marketplace. Such vendor registration requests may be received in response to a vendor solicitation from an event organizer or a facility owner. Such vendor registration requests may also be received in response to a vendor solicitation that is automatically generated by the event server 205 and transmitted to one or more vendors or vendor networks. In some embodiments, such vendor registration requests may include information to authenticate the identity of the requesting vendor, information regarding prior or existing relationships (e.g., contracts) between the vendor and the event organizer or facility owner, or information regarding items the vendor intends to offer for purchase or exchange at a physical event. In some embodiments, the request to register a vendor may be received by the event server 205 before the start of a physical event (e.g., before a vendor arrives at a physical event), or at the physical event (e.g., after the vendor arrives that the physical event). Processing the request to register a vendor may include verifying the identity of the vendor, such as by comparing the identity information provided in the vendor registration information to corresponding identity information available in one or more public or private databases. Processing the request to register a patron may also include determining, using the provided information about items the vendor intends to offer for purchase or exchange at the physical event, whether the items offered by the vendor satisfies on or more provided offering criteria or merchandise requirements. Such processing may also include receiving authorization information from an event organizer or a facility owner authorizing a vendor to register with the transaction system 200. Such processing may further include generating and storing an account (e.g., a database record) for the vendor, such as to store identity information, offered item information, and other data associated with the vendor.

A request to register a patron may be received from one or more patrons before the start of a physical event or during the occurrence of a physical event. Such request to register a patron may include patron registration information, such as information to verify the identity of a patron or to verify that the patron is authorized to attend the physical event, such as a barcode or other unique indicator of an event ticket purchased by the patron. Processing the request to register a patron may include verifying the identity of the patron, such as by comparing the identity information provided in the patron registration information to corresponding identity information available on one or more public or private databases. Processing the request to register a patron may also include verifying that the patron is authorized to attend the physical event, such as by comparing authorization information provided in the patron registration information to stored authorization information available to the transaction system 200. Such processing may further include generating and storing an account (e.g., a database record) for the patron, such as to store identity information and other data associated with the patron.

A request to process a transaction may be received from one or more entities that are registered with the transaction system 200. Such transactions may include a request to offer for purchase (e.g., offer an item for exchange), or to purchase of an offered item (e.g., a request to exchange a first item, such as a specified amount of a currency, for a second item). Processing a request to offer an item for purchase may include verifying that the offered item satisfies a prescribed offering criteria and adding the item to a data record in a database of offered items associated with the entity (e.g., a vendor, a patron, or an event organizer) offering the item.

In some embodiments, processing a request to purchase an item may include identifying an entity offering the item for purchase, querying the entity to determine whether the offering entity intends complete the sale transaction, and facilitating and validating the completion of the transaction. Such facilitating may include providing the purchasing entity (e.g., a patron) with the physical location of the offering entity, such as to enable the two entities to complete the transaction in person. Such facilitating may also include authenticating the identity of the purchasing entity or the offering entity, such as by using previously received registration information, Such facilitating may also include processing or confirming a payment from the purchasing entity to the offering entity. Such facilitating may further include verifying that the purchasing entity obtained possession of the item.

In some embodiments, processing a request to purchase an item may include broadcasting, such as by using a data communication network, the request to one or more entities that are registered with the transaction network 200. Such processing may also include receiving, from one or more registered entities, an intent to offer the requested item for purchase. Such processing may then include facilitating the sale transaction, as described herein.

A request to generate demographic information may be received from an event organizer, such as to determine pricing and merchandising requirements for a physical event. Such requests may also be received from a vendor, such as to determine whether to offer items for purchase at physical event or to determine whether to offer sales promotions, such as collective buying offers, at the physical event. The transaction system 200, may collect demographic information based on tickets purchased for an event, entities registered with the transaction system 200, or any other source of demographic information available to the system 200. Such demographic information may be processed, such as by using one or more statistical or machine learning algorithm, to generate insights into purchasing trends associated with an event, or with entities attending an event. Processing the request to generate demographic information may include generating and providing such insights to a requesting event organizer or vendor.

Returning to the event server 205, the one or more event objects 215 may include a database record, a database, or another data structure to store information associated with a physical event registered with the system 200, An event object 215 may be generated in response to receiving an event registration request, such as from an event organizer. An event object 215 may include an organizer data object 220, a participation criteria data object 225, an offering criteria data object 230, a demographic data object 235, a vendor data object 240, and a patron data object 245.

The organizer data object 220 may include a database record, a database, or another data structure to store information about an event organizer. Such information may be received from a remote computing device, such as the organizer device 250, in a request to register an event with the transaction system 200. Such information may also be received in a request to register an event organizer, or a computing system associated with an event organizer, with the transaction system 250. Such information may also be received in a request to register an event with the transaction system 200. Such information may include authentication information, such as to enable to transaction system 200 to verify the identity of the event organizer or to authenticate a transaction including the event organizer. Such information may also data or other information associated with services or items offered by the event organizer. Such services may include the sale of tickets, passes, or other token items that a patron may purchase to attend, or participate in, a physical event. Such information may also include any other data items or information that an event organizer may provide to the transaction system 200, or that the transaction system may automatically generate, such as to facilitate the operations of the transaction system 200 or the network-based marketplace 102.

The participation criteria data object 225 may include a database record, a database, or another data structure to store one or more criteria that an entity must satisfy to register with the transaction system 200, as described herein.

The offering criteria data object 230 may include a database record, a database, or another data structure to store one or more criteria that an entity, such as vendor, must satisfy to use the transaction system 200 to offer items for purchase at a physical even, Such participation criteria may correspond to one or more merchandise expectations provided by an event organizer. In some embodiments, the offering criteria data object 230 may be included within the participation criteria data object 225.

The demographic data object 235 may include a database record, a database, or another data structure to store demographic information collected by the transaction system 200. In some embodiments, such demographic information may include insights, or one or more algorithm for generating insights based on the demographic information, as described herein.

The vendor data object 240 may include a database record, a database, or another data structure 214 to store information associated with each vendor that is registered with the transaction system 200. Such information may include vendor account information 242 and offered items information 243. The vendor account information may include authentication information, such as to enable the transaction system 200 to verify the identity of a vendor or to authenticate a transaction including the vendor. Such information may also include any other data items or information that a vendor may provide to the transaction system 200, or that the transaction system may automatically generate, such as to enable the transaction system to facilitate transactions between a vendor and one or more other entity registered with the transaction system 200 or with the network-based marketplace 102. The offered items 243 may include information associated, or describing, one or more items offered by for purchase by a vendor.

The patron data object 245 may include a database record, a database, or another data structure 246 to store information associated with each patron that is registered with the transaction system 200. Such information may include patron account information 247. The patron account information may include authentication information, such as to enable the transaction system 200 to verify the identity of a patron, to authenticate the authorization of a patron to use the transaction system 200, or to authenticate a transaction including the patron. Such information may also include any other data items or information that a patron may provide to the transaction system 200, or that the transaction system may automatically generate, such as to enable the transaction system to facilitate transactions between a patron and one or more other entity registered with the transaction system 200 or with the network-based marketplace 102.

Figure 9:
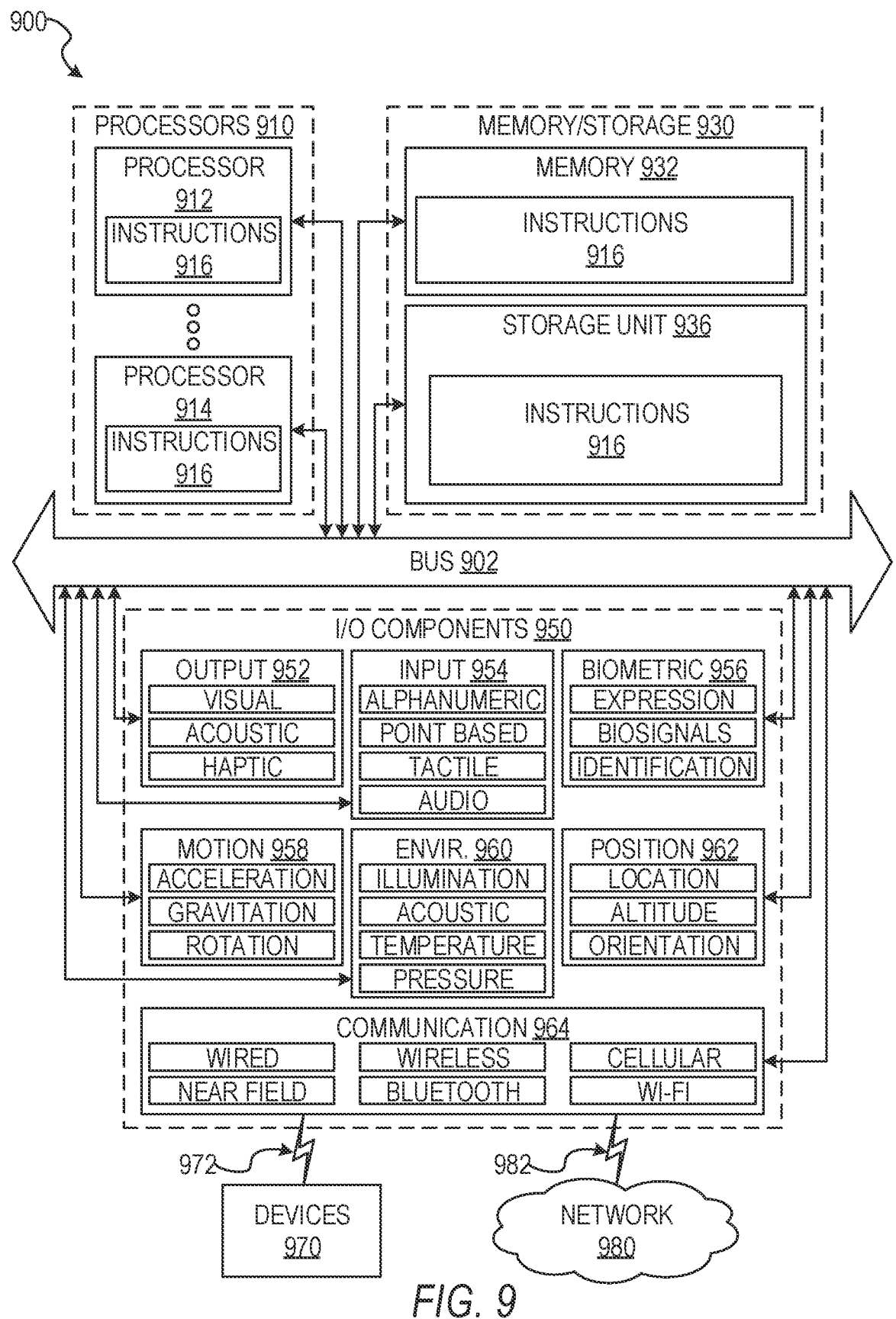
FIG. 9 illustrates a diagrammatic representation of a machine in the form of a computer system within which a set of instructions may be executed for causing the machine to perform any one or more of the methodologies discussed herein, according to various embodiments.

The organizer device 250, the vendor device 265, and the patron device 280 may include one or more computing devices (e.g., the machine 900, as shown in FIG. 9) associated with, or operated by, an event organizer, a vendor, and a patron, respectively. In some embodiments, the organizer device 250, the vendor device 265, or the patron device 280 may include a network-connected application 255, 270, or 285, such a web browser or an application for interface with a social media platform. The organizer device 250, the vendor device 265, or the patron device 280 may also include an event client 260, 275, or 290. In some embodiments, the event client 260, 275, or 290 may be a standalone software application that is configured to interface with the event server 205. In other embodiments, the event client 260, 275, or 290 may be a data structure including computer executable code or an electronic link to computer executable code. Such data structure may be configured to integrate with the network-connected application 255, 270, or 285, such as to enable an entity that is registered with the transactions system 200 to execute one or more transactions using the transaction system using an interface generated by the network-based application. The event client 260, 275, 290 may be generated and distributed (e.g., published) by the transaction system 200, such as in response to registering a new physical event. In an example, the event client 260 may generate a graphical user interface, or may interface with a graphic user interface of the application 255, to enable an event organizer to access account information stored on the event server 205, or to execute a transaction, such as a ticket sale, with the patron device 280. In another example, the event client 290 may generate a graphical user interface, or may interface with a graphic user interface of the application 285, to enable a patron to browse items offered for purchase, submit a request to purchase an item, or otherwise complete one or more other transactions using the transaction system 200.

In some embodiments, registered vendors and listings of items offered for sale may be organized in groupings, such as by similarity, theme, subject matter, or any other categories, such as to present a logical marketplace that may be efficiently searched or navigated. Such groups may be presented, such as through an interface associated with an event client, as a digital catalog of items and services available around the physical location of an entity.

Figure 3:
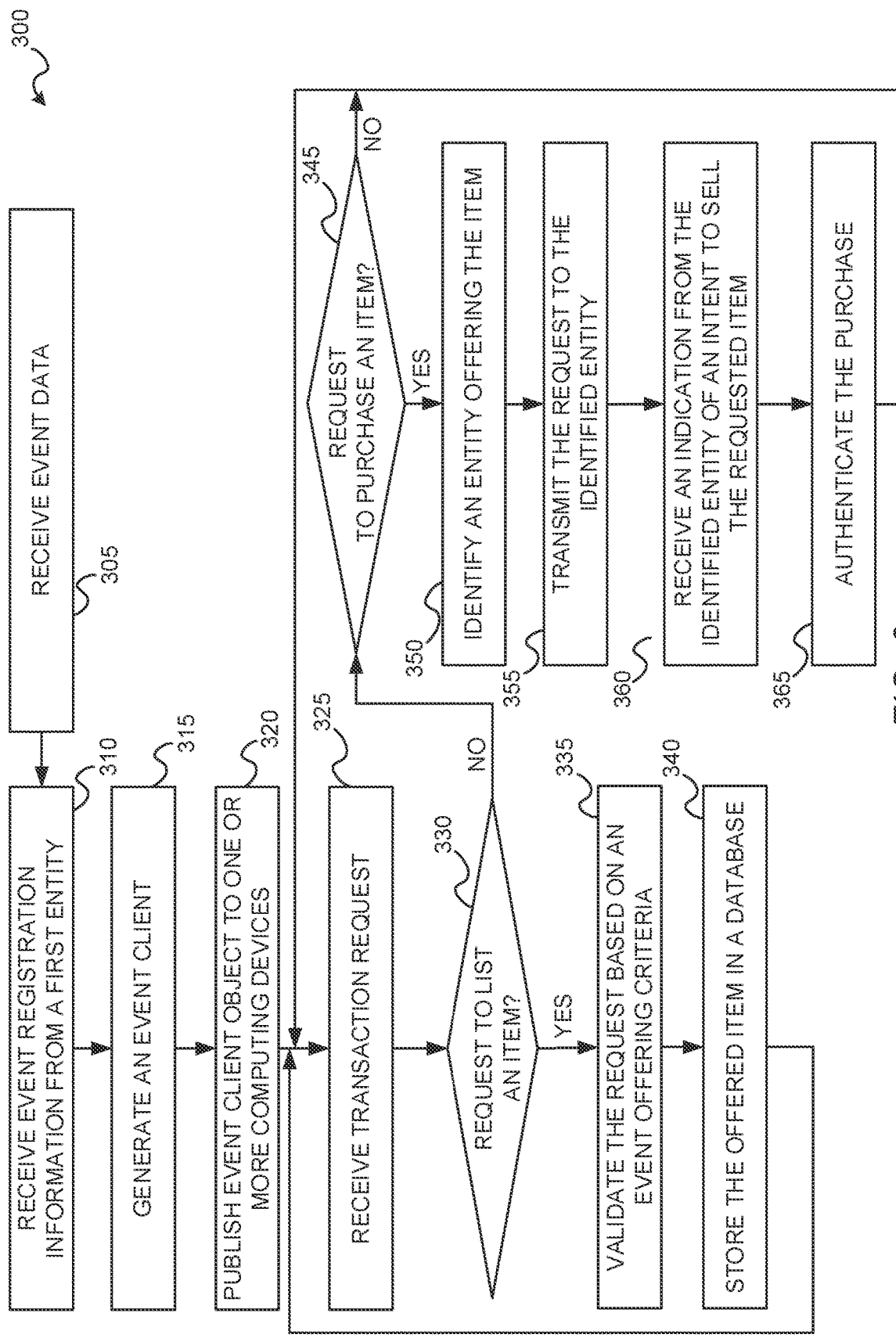
FIG. 3 depicts an example of a process for facilitating transactions at an event at a physical location, according to various embodiments.

FIG. 3 depicts an example of a process 200 for facilitating transactions between entities physically present at a physical event, according to various embodiments. The process 300 may be executed by a transaction system, such as the transaction system 200. At 305, event data may be received. Such event data may include a physical location of a physical event and other information for registering the physical event with a transaction system. At 310, event registration information may be received from a first entity, such as an event organizer. At 315, an event data client may be generated. At 320, a data structure including an event client may be generated and published to one or more entities. Such one or more entities may use the published event client, or other techniques, to register with the transaction system, as described herein. At 325, a transaction request may be received from one more entities, such as a vendor or a patron. At 330, a determination can be made as to whether the transaction request includes a request to offer an item for exchange (e.g., a request to list an item) at the physical event, such as by using the transaction system. The process 300 may be continued at 335 when the transaction request includes a request to offer an item for exchange at the physical event, while the process 300 may be continued at 345 when the transaction request does not include a request to offer an item for exchange at the physical event.

At 335, a request to offer an item for exchange at a physical event may be validated. Such validating may include comparing the offered item to a prescribed offering criteria, as described herein. Such validating may also include authenticating the entity making the request, such as by using entity identification information provided in an entity registration request and stored in an account associated with the entity. At 340, the offered item may be stored, such as in a data record, a database, or other data structure that is associated with the entity making the request and that is accessible to the transaction system. In some embodiments, the request may be transmitted or broadcast to one or more registered entities. Execution of the process 300 may then return to step 325.

At 345, it may be determined whether the transaction request received at 325 includes a request to purchase an item (e.g., exchange a first item for a second item). The process 300 may be continued at 350 when the transaction request received at 325 includes a request to purchase an item, while the process 300 may be continued at 325 when the transaction request received at 325 does not include a request to purchase an item.

At 350, an entity offering the requested item may be identified, such as by extracting the identity of the entity from the request received at 325, or by querying one or more databases, parsing one or more data structures accessible to the transaction system.

At 355, the purchase request can be transmitted to the identified entity (e.g., an offering entity). In some embodiments, such transmitting may include anonymizing the request, such as to protect the identity of the requesting entity from the identified entity. At 360, an indication of an intent to sell the requested item may be received identified entity. At 365, the purchase of the requested item may be authenticated, as described herein.

Figure 4:
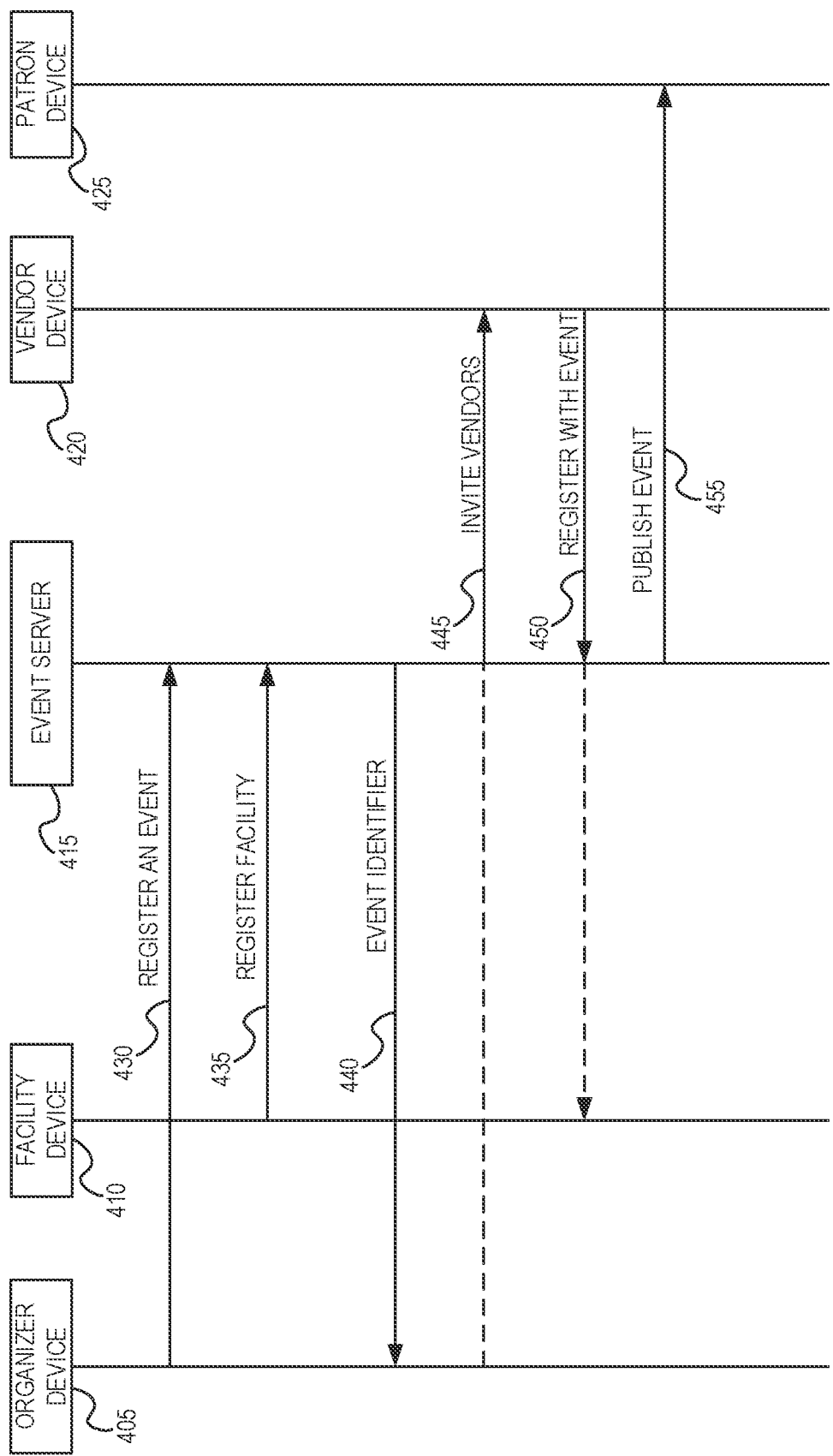
FIG. 4 illustrates a diagram showing an example of interactions for configuring a transaction system for facilitating transactions at an event at a physical location, according to various embodiments.

FIG. 4 illustrates a diagram showing an example of entity interactions for configuring a transaction system for facilitating transactions at a physical event, according to various embodiments. Such interactions may be executed using a transaction system, such as the transaction system 200, as shown in FIG. 1. The diagram includes an organizer device 405, an event server 415, a vendor device 420, and a patron device 425, which may correspond, respectively, to the organizer device 250, the event server 205, the vendor device 265, and the patron device 280, as shown in FIG. 2. The diagram also includes a facility device 410, such as a computing device configured to enable a facility, or venue over, to execute one or more transactions with the transaction system. At 430, the event server 415 may receive, from the organizer device 405, a request to register an event with the transaction system. At 435, the event server 415 may receive, from the facility device 410, a request to register a facility with the transaction system. At 440, the event server 415 may provide an event identifier to the organizer device 405. Such event identifier may be used to uniquely identify an event registered with the event server 415. In some embodiments, providing the event identifier may include providing an event client, or a link to an event client, as described herein. At 445, the event server 415 or the organizer device 405 may transmit an invitation to one or more vendors to register with the transaction system, such as to cause the one or more vendors to offer items of for purchase at the physical event. Such invitation may include an event identifier, an event client, or a link to an event client, as described herein. Such invitation may be sent to a marketplace of pre-approved vendors, one or more vendors having pre-negotiated contracts with the facility or venue, or to any other set of potential vendors. At 450, the event server 415 or the facility device 410 may receive a registration request from one or more devices 415. At 455, the event server 415 may publish the physical event to one or more patron devices 425, as described herein.

Figure 5:
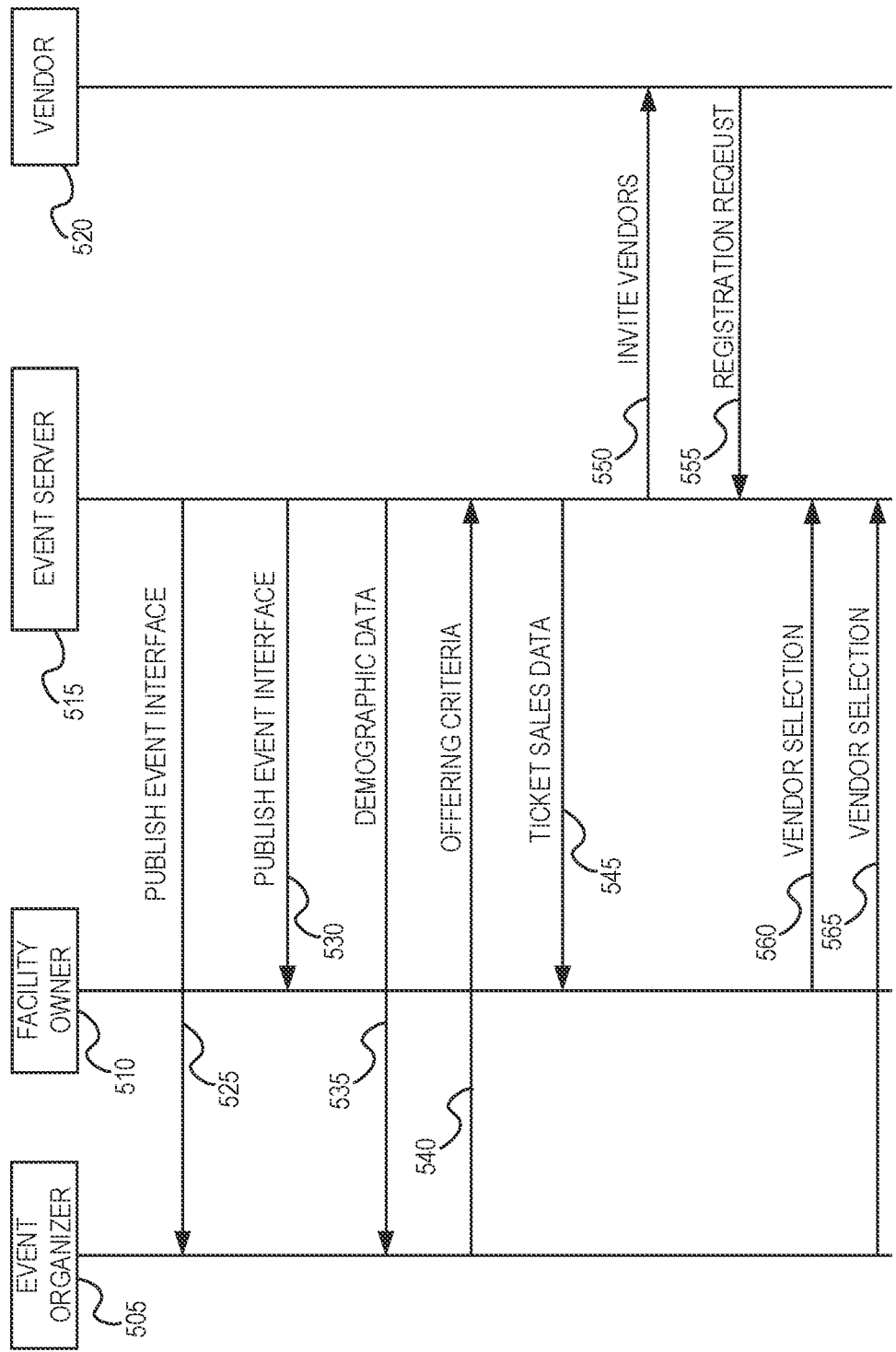
FIG. 5 is a diagram of an example of interactions for registering a vendor in a transaction system for facilitating transactions at an event at a physical location, according to various embodiments.

FIG. 5 is a diagram of an example of interactions for registering a vendor in a transaction system, such as for facilitating transactions at an event at a physical location. The diagram includes an organizer device 505, an event server 515, and a vendor device 520, which may correspond, respectively, to the organizer device 250, the event server 205, and the vendor device 265, as shown in FIG. 2. The diagram also includes a facility device 510, such as a computing device configured to enable a facility, or venue over, to execute one or more transactions with the transaction system. At 525 and 530, the event server 515 publish an interface to a registered physical event to the organizer device 505 and the facility device 510, respectively. At 535, the event server 515 may transmit a demographic data, such as demographic data and insights derived from ticket sales, to the organizer device 505. At 540, the event server 515 may receive one or more offering criteria from the organizer device 505. At 545, ticket sales data, such as a quantity of tickets sold, may be transmitted to the facility device 510. At 550, vendors may be invited to register with the transaction system. At 555, one or more vendor registration requests may be received. In some embodiments, the event server 515 may compare the registration request to one or more participation criteria to determine, such as by using the received offering criteria, whether a vendor is qualified to register with the transaction system. In other embodiments, the event server 515 transmit the vendor registration request to the organizer device 505 or the facility device 510 to enable to an event organizer or a facility owner to select, such as by using the demographic data and the ticket sales data, one or more vendors to register with the transaction system. At 560 and 564, the event server 515 may receive the vendor selections form the organizer device 505 or the facility device 510, respectively.

Figure 6:
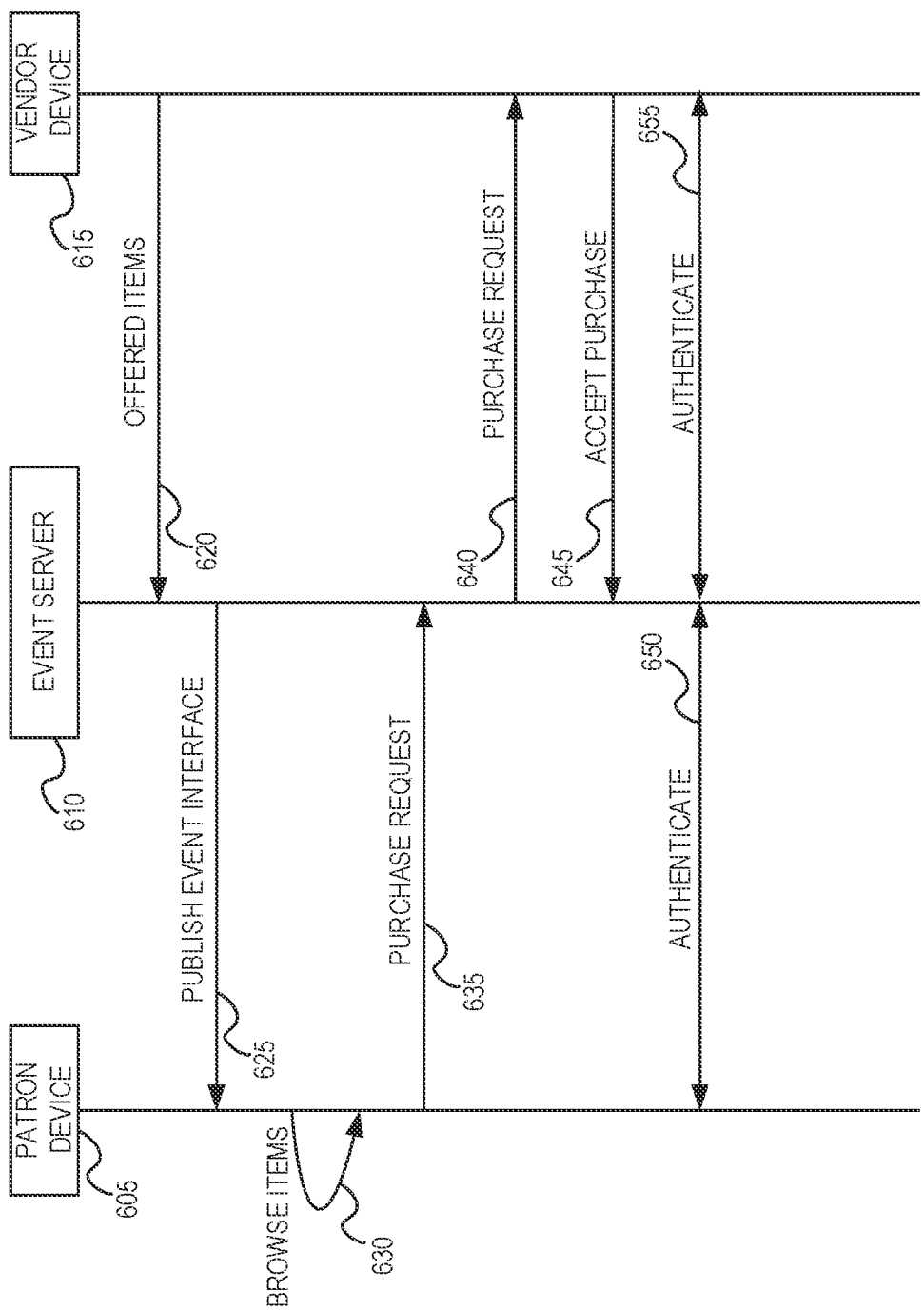
FIG. 6 is a diagram of an example of interactions for facilitating a transaction in a transaction system for facilitating transactions at an event at a physical location, according to various embodiments.

FIG. 6 is a diagram of an example of interactions for facilitating a transaction in a transaction system for facilitating transactions at a physical event, according to various embodiments. The diagram includes a patron device 605, an event server 610, and a vendor device 615, which may correspond, respectively, to the patron device 280, the event server 205, and the vendor device 265, as shown in FIG. 2. In some embodiments, the vendor device 615 may be another patron device 605 or an organizer device, such as the organizer device 250, as shown in FIG. 2. At 620, a list of one or more items offered for purchase may be received. At 625, an event interface may be published to the patron device 605. At 630, the patron device 605 may browse the list of offered items. At 635, the event server 610 may receive a purchase request (e.g., a transaction request) from the patron device 605. At 640 the event server 610 may transmit the purchase request to the vendor device 615. At 645, the vender device may accept the purchase request. At 650 and 655, the event server 610 may authenticate the purchase between to the patron device 605 and the vendor device 615, as described herein.

Figure 7:
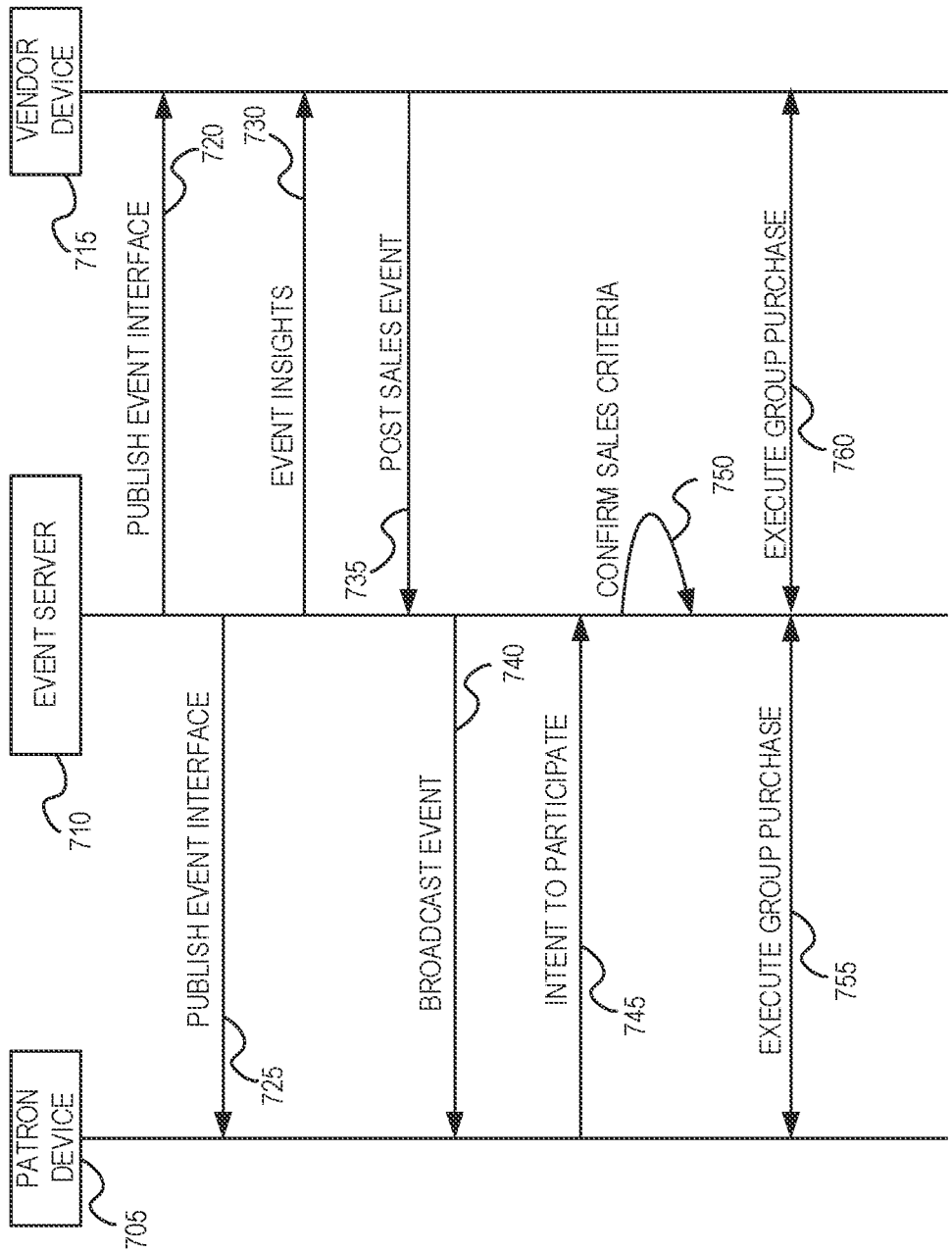
FIG. 7 is a diagram of an example of interactions for facilitating a group transaction in a transaction system for facilitating transactions at an event at a physical location, according to various embodiments.

FIG. 7 is a diagram of an example of interactions for facilitating a group transaction in a transaction system for facilitating transactions at a physical event, according to various embodiments. The diagram includes a patron device 705, an event server 710, and a vendor device 715, which may correspond, respectively, to the patron device 280, the event server 205, and the vendor device 265, as shown in FIG. 2. At 720 and 725, an event interface may be published to the patron device 605 and the vendor device 715, respectively. At 730, the vendor device 715 may receive event insights, such as purchasing and pricing trends, from the event server 710. At 715, the vendor device may publish a sales event based on the received event insights. Such sales event may be a collective buying event whereby a vendor may offer discounts on the purchase of one or more items provided that a minimum number of patrons purchase the item. In an example, when the physical event is a concert, a vendor may over a 15% discount on a T-shirt having a performer's imprint provided that 2000 patrons buy the shirt at the event. At 740, the event server may broadcast the sales event to one or more patron device. At 745, one or more client devices 705 may transmit a message, including an intent to participate in the sales event, to event server 710. At 750, the event server may accumulate the patron responses and determine whether a sales criteria, such as minimum number of sales, has been satisfied. At 755 and 760, the server system may execute the group purchase, such as by enabling patrons that expressed an into to participate in the sales event to purchase the offered item at the offered discount.

Figure 8:
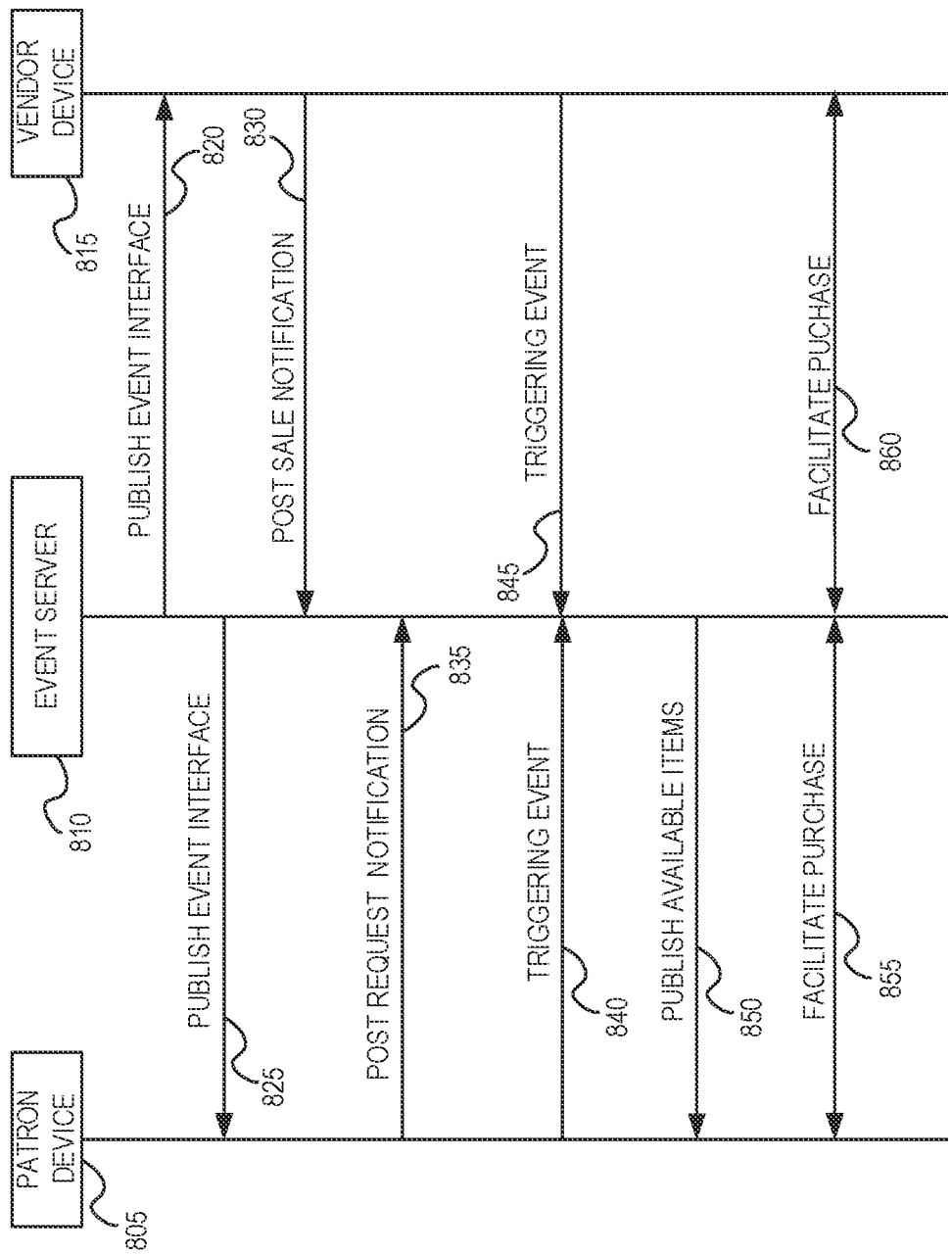
FIG. 8 is a diagram of an example of interactions for facilitating a transaction in a transaction system, according to various embodiments.

FIG. 8 is a diagram of an example of interactions for facilitating a transaction in a transaction system, according to various embodiments. The interactions shown in FIG. 8 may be carried out, or executed, in response to an event, such as the installation or the execution of a software application, such as an electronic game, on one or more computing devices (e.g., patron device 280 or vendor device 250). Such interactions may be carried out to execute a transaction to exchange (e.g., sell or purchase) an item, such as an electronic good, in a temporary or ad hoc electronic marketplace that is generated by the proximity of one marketplace participant to another marketplace participant. An electronic good may include digital objects that are useful in a particular software environment, such as in an electronic game or a simulated environment. An electronic good may also include digital media, such as music, videos, or images. The diagram showing in FIG. 8 includes a patron device 805, an event server 810, and a vendor device 815, which may correspond, respectively, to the patron device 280, the event server 205, and the vendor device 265, as shown in FIG. 2. In some embodiments, the vendor device 815 may be another patron device 805 or an organizer device, such as the organizer device 250, as shown in FIG. 2. In certain embodiments, the event server 810 may be an application executing on the patron device 805 or the vendor device 815.

At 820 and 825, an event interface may be published to the patron device 805 and to the vendor device 815, respectively. The event interface may enable the patron device 805 or the vendor device 815 to interface, or otherwise interact, with the event server 810, as described herein.

At 830, the vendor device 815 may post a sale notification, such as to indicate an item offered for exchange (e.g., sale) by the vendor device. In some embodiments, the sale notification may include a description of the item, such as to indicate that the item is an electronic item (e.g., virtual item) that is useful in a particular application or simulated environment. In some embodiments, the sale notification may include a sample of the item, such as an electronic sample of a song, video, or music album. In some embodiments sale notification may include information to facilitate the sale of the item, such as a sales price, vendor location information, or a requirement that a potential purchaser (e.g., a patron) be within a specified distance of the vendor device 815.

At 835, the patron device 805 may post an item request notification, such as to indicate an item that a user of the patron device 805 is interested in a purchasing. In some embodiments, the request notification may include a description of the item, such as to indicate that the item is an electronic item that is useful in a particular application or simulated environment. In certain embodiments, the request notification may include information to facilitate a purchase the requested item, such as a requirement that a potential seller (e.g., a vendor) be within a specified distance of the patron device 805.

At 840 and 845, the event server 810 may receive a triggering event, such as by determining the occurrence of, or the satisfaction of, one or more triggering conditions. Such triggering conditions may be specified in a registration process or in a sales or request notification, as described herein. In some embodiments, a triggering event may include a patron device 805 moving within specified distance of a vendor device 815. Such triggering event may also include a vendor device 815 moving within specified distance of a patron device 805. The event server 810 may determine the occurrence of a triggering condition, or event, by receiving location data for one or more patron device 805 or vendor device 815 and comparing the location data to stored proximity or distance requirements.

At 850, the event server may publish, in response to the triggering event, one or more items that are available for purchase by the patron device 805, such as items to match a request notification posted by the patron device. In some embodiments the event server 810 may only publish items available for purchase to patron devices 805 that are within a specified distance of the vendor device 815. In some embodiments, the event server may also notify a patron device 815 of a request notification received from a patron device 805 in response the triggering event.

At 855 and 860, the event server 810 can facilitate an exchange of an item that was published at 850 and selected by a patron device, such as be processing a payment for the item and enabling the patron device to receive or download the item.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, later, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a. "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions may cause the machine to execute the flow diagram of FIG. 3 or the interaction diagrams of FIGS. 4-8. The instructions transform the general, non-programmed machine into a particular machine programmed to carry, out the described and illustrated functions in the manner described. In alternative embodiments, the machine 900 may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

In some embodiments, the instructions 916 may include software applications and associated processes such applications 112, 114, 120, and 122, as well as for software based components of the event server 205, the organizer device 250, the vendor device 265, or the patron device 280 management system 235.

The machine 900 may include processors 910, memory 930, and I/O components 950, which may be configured to communicate with each other such as via a bus 902. In an example embodiment, the processors 910 (e.g., a Central Processing Unit (CPU), a Reduced instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media. (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 8. The I/O components 950 are grouped according to functionality merely for simplifying the following discussion and the grouping is in no way limiting various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The PO components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NEC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WI-AN), a wide area network (WAN), a wireless WAN (\MAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system, comprising:
one or more servers having one or more processing circuits and a non-transitory storage medium, the non-transitory storage medium having computer code that is executable by the one or more processing circuits to cause the system to perform operations comprising:
receiving, by a client device interface comprising communication circuits of an event server of an online network, data indicative of physical location from a first computing device associated with a first entity;
associating, by one or more processing circuits of the event server, an event with the physical location, the event having a start time after which the event is underway;
prior to the start time of the event, generating, by the one or more processing circuits of the event server, a data object comprising a database record to be stored in a database of the event server, to enable the first entity to exchange one or more physical merchandise items with a second entity while the first entity and the second entity are both within a given distance of the event;
detecting, by the client device interface comprising the communication circuits of the event server, that the first entity is within a threshold distance of the second entity at the event;
in response to detecting that the first entity is within the threshold distance of the second entity at the event at a time after the start time when the event is underway, temporarily generating, by the one or more processing circuits of the event server, a marketplace that publishes, using the data object stored in the database of the event server, and causes presentation of listings for a plurality of physical merchandise items available for purchase from the first entity on a second computing device associated with the second entity, each of the listings for the plurality of physical merchandise items being associated with the event;
receiving, by the client device interface comprising the communication circuits of the event server from the second computing device of the second entity, a purchase request associated with an individual listing for an individual physical merchandise item of the plurality of physical merchandise items;
in response to receiving the purchase request, notifying, by the client device interface comprising the communication circuits of the event server, the first entity of a purchase request received from the second computing device of the second entity; and
in response to receiving the purchase request by the online network, providing by the client device interface comprising the communication circuits of the event server to the second computing device of the second entity, the physical location of the first computing device to enable the first and second entities to complete a transaction in person.

2. The system of claim 1, wherein the marketplace being temporarily generated by a proximity of the first computing device to the second computing device, and wherein the operations further comprise:
publishing the plurality of physical merchandise items based on participation criteria, the participation criteria comprising a condition that the second computing device be physically present at the location associated with the event during occurrence of the event.

3. The system of claim 1, wherein the operations further comprise:
accumulating entity responses from a plurality of entities that are physically present at the event, each entity response indicating an interest in purchasing an item of the plurality of physical merchandise items;
determining whether the accumulated responses from the plurality of entities satisfy a sales criteria; and
executing a group purchase of the item for each of the plurality of entities that indicated the interest in purchasing the item.

4. The system of claim 1, wherein the operations further comprise:
obtaining a barcode or unique indicator of an event ticket purchased by the second entity;
comparing the barcode or unique indicator to authorization information; and
determining that the second entity is authorized to attend the event in response to comparing the barcode or unique indicator to the authorization information, wherein the physical merchandise items available for purchase from the first entity are published to the second entity in response to determining that the second entity is authorized to attend the event.

5. The system of claim 1, wherein the operations further comprise:
receiving, from the second computing device, a request from the first entity to offer an item for exchange at the event;
validating the request based on an offering criteria; and
storing the offered item in a database.

6. The system of claim 5, wherein the offering criteria comprises a condition requiring a correlation between the offered item and a subject matter of the event.

7. The system of claim 5, wherein the offering criteria comprises a condition determined by an entity associated with a facility at a geographic location of the event.

8. The system of claim 5, wherein the offering criteria comprises a condition specified by an entity organizing the event.

9. The system of claim 1, wherein the operations further comprise:
receiving, from the second computing device, a request from the first entity to exchange a first item for a second item;
determining that the second entity offers the second item for exchange at the event;
transmitting the request to the second computing device of the second entity during the event;
receiving, from the second entity, an indication of an intent to exchange the second item for the first item; and
authenticating the exchange between the first entity and the second entity.

10. The system of claim 9, wherein the second item is an item offered for sale, the first item is a specified amount of currency, and authenticating the exchange comprises verifying that the second entity receives the specified amount of the currency.

11. The system of claim 1, wherein the first entity and the second entity are, respectively, at least one of:
a first patron of the event and a second patron of the event, a patron of the event and an organizer of the event, or a patron of the event and a merchant at the event.

12. A method, comprising:
receiving, by a client device interface comprising communication circuits of an event server of an online network, data indicative of physical location from a first computing device associated with a first entity;
associating, by one or more processing circuits of the event server, an event with the physical location, the event having a start time after which the event is underway;
prior to the start time of the event, generating, by the one or more processing circuits of the event server, a data object comprising a database record to be stored in a database of the event server, to enable the first entity to exchange one or more physical merchandise items with a second entity while the first entity and the second entity are both within a given distance of the event;
detecting, by the client device interface comprising the communication circuits of the event server, that the first entity is within a threshold distance of the second entity at the event;
in response to detecting that the first entity is within the threshold distance of the second entity at the event at a time after the start time when the event is underway, temporarily generating, by the one or more processing circuits of the event server, a marketplace that publishes, using the data object stored in the database of the event server, and causes presentation of listings for a plurality of physical merchandise items available for purchase from the first entity on a second computing device associated with the second entity, each of the listings for the plurality of physical merchandise items being associated with the event;
receiving, by the client device interface comprising the communication circuits of the event server from the second computing device of the second entity, a purchase request associated with an individual listing for an individual physical merchandise item of the plurality of physical merchandise items;
in response to receiving the purchase request, notifying, by the client device interface comprising the communication circuits of the event server, the first entity of a purchase request received from the second computing device of the second entity; and
in response to receiving the purchase request by the online network, providing by the client device interface comprising the communication circuits of the event server to the second computing device of the second entity, the physical location of the first computing device to enable the first and second entities to complete a transaction in person.

13. The method of claim 12, further comprising publishing the plurality of physical merchandise items based on participation criteria, the participation criteria comprising a condition that the second computing device be physically present at the location associated with the event during occurrence of the event.

14. The method of claim 12, further comprising:
accumulating entity responses from a plurality of entities that are physically present at the event, each entity response indicating an interest in purchasing an item of the plurality of physical merchandise items;
determining whether the accumulated responses from the plurality of entities satisfy a sales criteria; and
executing a group purchase of the item for each of the plurality of entities that indicated the interest in purchasing the item.

15. The method of claim 12, further comprising:
obtaining a barcode or unique indicator of an event ticket purchased by the second entity;
comparing the barcode or unique indicator to authorization information; and
determining that the second entity is authorized to attend the event in response to comparing the barcode or unique indicator to the authorization information, wherein the items available for purchase from the first entity are published to the second entity in response to determining that the second entity is authorized to attend the event.

16. The method of claim 12, further comprising:
receiving, from the second computing device, a request from the first entity to offer an item for exchange at the event;
validating the request based on an offering criteria; and
storing the offered item in a database.

17. The method of claim of claim 12, wherein the one or more physical merchandise items comprise a wearable item.

18. A non-transitory computer-readable storage medium storing a set of instructions that, when executed by at least one processor of a machine, cause the machine to perform operations comprising:
receiving, by a client device interface comprising communication circuits of an event server of an online network, data indicative of physical location from a first computing device associated with a first entity;
associating, by one or more processing circuits of the event server, an event with the physical location, the event having a start time after which the event is underway;
prior to the start time of the event, generating, by the one or more processing circuits of the event server, a data object comprising a database record to be stored in a database of the event server, to enable the first entity to exchange one or more physical merchandise items with a second entity while the first entity and the second entity are both within a given distance of the event;
detecting, by the client device interface comprising the communication circuits of the event server, that the first entity is within a threshold distance of the second entity at the event;
in response to detecting that the first entity is within the threshold distance of the second entity at the event at a time after the start time when the event is underway, temporarily generating, by the one or more processing circuits of the event server, a marketplace that publishes, using the data object stored in the database of the event server, and causes presentation of listings for a plurality of physical merchandise items available for purchase from the first entity on a second computing device associated with the second entity, each of the listings for the plurality of physical merchandise items being associated with the event;
receiving, by the client device interface comprising the communication circuits of the event server from the second computing device of the second entity, a purchase request associated with an individual listing for an individual physical merchandise item of the plurality of physical merchandise items;

in response to receiving the purchase request, notifying, by the client device interface comprising the communication circuits of the event server, the first entity of a purchase request received from the second computing device of the second entity; and in response to receiving the purchase request by the online network, providing by the client device interface comprising the communication circuits of the event server to the second computing device of the second entity, the physical location of the first computing device to enable the first and second entities to complete a transaction in person.

19. The non-transitory computer-readable storage medium of claim 18, wherein the operations further comprise:

publishing the plurality of physical merchandise items based on participation criteria, the participation criteria comprising a condition that the second computing device be physically present at the location associated with the event during occurrence of the event.

20. The non-transitory computer-readable storage medium of claim 18, wherein the operations further comprise:

accumulating entity responses from a plurality of entities that are physically present at the event, each entity response indicating an interest in purchasing an item of the plurality of physical merchandise items;

determining whether the accumulated responses from the plurality of entities satisfy a sales criteria; and executing a group purchase of the item for each of the plurality of entities that indicated the interest in purchasing the item.

\* \* \* \* \*